United States Patent
Marchesini

(10) Patent No.: US 9,809,382 B2
(45) Date of Patent: Nov. 7, 2017

(54) SLIDE VALVE FOR A HOPPER CONTAINING POWDERED MATERIAL OR MATERIAL WITH A SMALL GRAIN SIZE

(71) Applicant: WAMGROUP S.p.A., Modena (IT)

(72) Inventor: Vainer Marchesini, San Prospero (IT)

(73) Assignee: WAMGROUP S.P.A., Modena (IT)

( * ) Notice: Subject to any disclaimer, the term of this patent is extended or adjusted under 35 U.S.C. 154(b) by 0 days.

(21) Appl. No.: 15/023,826

(22) PCT Filed: Sep. 26, 2014

(86) PCT No.: PCT/IB2014/064873
§ 371 (c)(1),
(2) Date: Mar. 22, 2016

(87) PCT Pub. No.: WO2015/049622
PCT Pub. Date: Apr. 9, 2015

(65) Prior Publication Data
US 2016/0236861 A1    Aug. 18, 2016

(30) Foreign Application Priority Data

Oct. 2, 2013    (IT) .............................. BO2013A0544

(51) Int. Cl.
*B65D 90/58* (2006.01)
*F16K 3/02* (2006.01)
*F16K 3/20* (2006.01)

(52) U.S. Cl.
CPC .......... *B65D 90/587* (2013.01); *F16K 3/0227* (2013.01); *B65D 2590/542* (2013.01); *F16K 3/0281* (2013.01); *F16K 3/205* (2013.01)

(58) Field of Classification Search
CPC ...... B65D 90/587; B65D 90/58; B65D 90/54; B65D 2590/542; F16K 3/02;
(Continued)

(56) References Cited

U.S. PATENT DOCUMENTS 1,727,677 A * 9/1929 Siebert, Jr. .............. F16K 3/205
138/94.3
1,868,147 A * 7/1932 Kruse ..................... F16K 3/207
126/285 A
(Continued)

FOREIGN PATENT DOCUMENTS

DE      3414874 A1 * 11/1984    ........... B65D 90/587
EP      0614828 A1 * 9/1994     ........... B65D 90/587
(Continued)

*Primary Examiner* — Mary McManmon
*Assistant Examiner* — David Colon Morales
(74) *Attorney, Agent, or Firm* — Leason Ellis LLP

(57) ABSTRACT

A slide valve for a powdered material or a material with a small grain size. The valve comprises a stiff frame, which defines a discharge mouth to discharge the material, and a shutter of the discharge mouth, which is activated by respective moving organs. The valve is characterized in that it comprises a height adjusting device for a sealing element. The height adjusting device is suited to compensate the loss of sealing effect between the lower face of the sealing element and an upper surface of the shutter. The loss of sealing power is due to the wear generated by the relative friction between the lower face and the surface.

8 Claims, 5 Drawing Sheets

(58) Field of Classification Search
CPC ........ F16K 3/0227; F16K 3/0281; F16K 3/10;
F16K 3/16; F16K 3/20; F16K 3/205
USPC ....... 251/159, 167, 170, 171, 172, 174, 187,
251/193, 195, 196, 197, 203, 204, 326,
251/327, 328
See application file for complete search history.

(56) References Cited

U.S. PATENT DOCUMENTS

| | | | | |
|---|---|---|---|---|
| 2,906,491 A | * | 9/1959 | Young | F16K 3/186 |
| | | | | 251/167 |
| 2,946,349 A | * | 7/1960 | Hamer | F16K 3/205 |
| | | | | 138/94.3 |
| 3,112,095 A | * | 11/1963 | Batzer | F16K 3/184 |
| | | | | 251/172 |
| 3,170,668 A | * | 2/1965 | Aulisa | F16K 3/20 |
| | | | | 137/556 |
| 3,266,525 A | * | 8/1966 | Wolter | F16K 3/207 |
| | | | | 138/94.3 |
| 3,352,535 A | * | 11/1967 | Power | F16K 3/16 |
| | | | | 251/187 |
| 3,367,625 A | * | 2/1968 | Fortune | F16K 3/207 |
| | | | | 251/172 |
| 3,669,149 A | * | 6/1972 | Guichon | F16K 3/02 |
| | | | | 137/625.48 |
| 3,704,722 A | | 12/1972 | Coleman | |
| 3,711,062 A | * | 1/1973 | Kirkwood | F16K 3/207 |
| | | | | 251/171 |
| 3,790,123 A | * | 2/1974 | Grove | F15B 1/02 |
| | | | | 251/172 |
| 4,060,183 A | * | 11/1977 | Puurunen | G01F 11/40 |
| | | | | 222/442 |
| 4,138,126 A | * | 2/1979 | Jaudt | F16K 27/044 |
| | | | | 251/159 |
| 4,174,728 A | * | 11/1979 | Usnick | F16K 3/205 |
| | | | | 137/240 |
| 4,394,022 A | * | 7/1983 | Gilmore | F16J 15/02 |
| | | | | 277/377 |
| 4,415,139 A | * | 11/1983 | Potts | F16K 3/0254 |
| | | | | 251/159 |
| 4,474,205 A | * | 10/1984 | Dreyer | F16K 3/0236 |
| | | | | 126/285 A |
| 4,486,003 A | * | 12/1984 | Meyer | F16K 3/186 |
| | | | | 251/167 |
| 4,491,253 A | * | 1/1985 | Coleman | B65D 90/587 |
| | | | | 105/282.1 |
| 4,509,717 A | * | 4/1985 | Wright | B65D 90/587 |
| | | | | 251/144 |
| 4,562,992 A | * | 1/1986 | Sugisaki | F16K 3/207 |
| | | | | 251/159 |
| 4,566,671 A | * | 1/1986 | Beson | F16K 3/207 |
| | | | | 251/159 |
| 4,776,564 A | * | 10/1988 | Westenberg | B65D 90/587 |
| | | | | 251/172 |
| 5,176,189 A | * | 1/1993 | Perchthaler | B65D 90/587 |
| | | | | 137/240 |
| 5,577,707 A | * | 11/1996 | Brida | F16K 3/20 |
| | | | | 251/159 |
| 5,927,684 A | * | 7/1999 | Marx | F16K 3/20 |
| | | | | 251/195 |
| 6,260,490 B1 | * | 7/2001 | Wark | F16K 3/10 |
| | | | | 110/101 R |
| 6,508,387 B1 | * | 1/2003 | Simon | B65D 90/587 |
| | | | | 137/554 |
| 6,964,727 B2 | * | 11/2005 | Lah | C10B 25/10 |
| | | | | 202/242 |

FOREIGN PATENT DOCUMENTS

| | | | | |
|---|---|---|---|---|
| GB | | 1 121 321 | 7/1968 | |
| GB | | 1 125 107 | 8/1968 | |
| GB | | 2071815 A | * 9/1981 | ............... F16K 3/20 |

* cited by examiner

SLIDE VALVE FOR A HOPPER CONTAINING POWDERED MATERIAL OR MATERIAL WITH A SMALL GRAIN SIZE

CROSS REFERENCE TO RELATED APPLICATIONS

The present application is a U.S. National Phase of International Patent Application PCT/IB2014/064873 filed on Sep. 26, 2014, which claims priority to Italian Application No. BO2013A000544, filed on Oct. 2, 2013, each of which is incorporated by reference as if expressly set forth in their respective entireties herein.

TECHNICAL FIELD

The present invention relates to a slide valve for a hopper (or for a silo) containing powdered material or material with a small grain size.

BACKGROUND ART

A known slide valve used in this technical field comprises, in general, a stiff frame having walls that define a discharge mouth for discharging the material, and a shutter having the shape of a flat horizontal plate; the shutter, which is moved by an actuator, is translated horizontally and is provided with a surface that is such as to shut/open the aforesaid discharge mouth.

As already mentioned above, a typical application of this kind of valves is the one concerning the opening/shutting of the bottom of silos or of any kind of hopper.

One of the technical problems affecting these slide vales is that of preventing the material from leaking from the shutter when the latter is in a discharge mouth shutting position and, furthermore, of preventing the powdered material, which sticks to the upper surface of the horizontal shutter, from being dragged and forced to leak through the passage slit of the horizontal shutter during the opening of the discharge mouth, namely when the shutter is retracted by the actuator.

A further problem that can arise when using this kind of valves for hoppers is that the lip of the gasket pressed against the upper surface of the shutter scrapes against this surface during the movements of the shutter and, therefore, the lip, in time, is subject to wear and looses or, anyway, decreases its capability to forbid the leaking of powdered material from the discharge hopper towards the hydraulic or pneumatic actuator, which is responsible for the forward and backward movements of the shutter itself.

All this can lead to the negative consequence that the shutter of the valve might not be able to perform the entire travel and completely open the discharge mouth, thus jeopardizing the speed with which the hopper standing above the valve is emptied. In the worst case scenario, the downward flow of the material could be stopped.

DISCLOSURE OF THE INVENTION

Therefore, the object of the present slide valve is to solve the above-mentioned technical problems by offering a solution that is functionally reliable as well as straightforward and low-cost to be manufactured.

This and other objects are reached by the subject-matter of the present invention as characterised in the appended Claims.

BRIEF DESCRIPTION OF THE DRAWINGS

The present invention will be best understood upon perusal of the following detailed description of a preferred embodiment, which is provided by way of example and is not limiting, with reference to the accompanying drawings, in which:

FIG. 1) of the valve of FIG. 1 in a first configuration;

FIG. 1) of the valve of FIG. 1 in a second configuration; FIG. 1) of the valve of FIG. 1 in a third configuration.

BEST MODE FOR CARRYING OUT THE INVENTION

Figure 1:
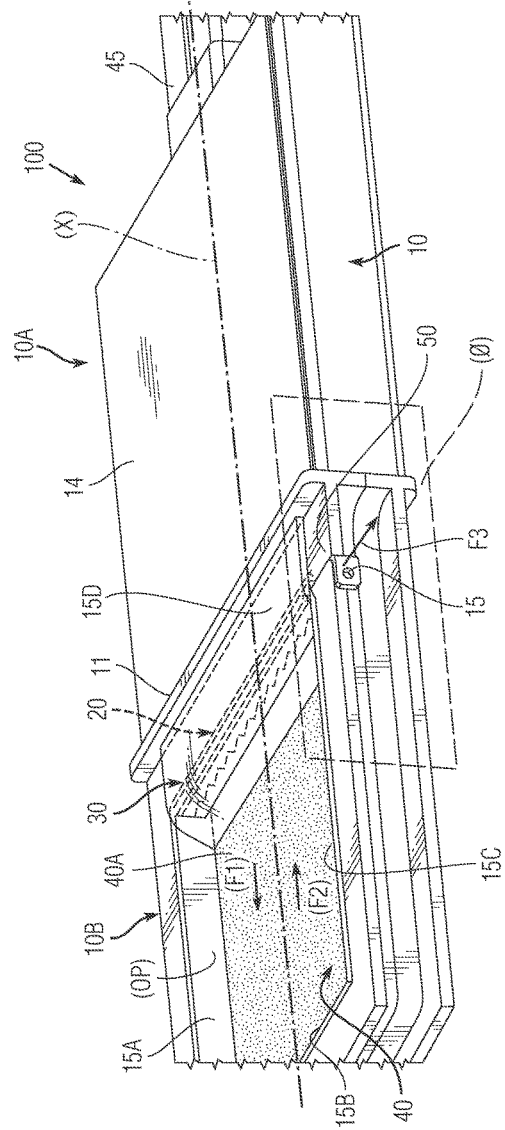
FIG. 1 shows a perspective view of a slide valve according to the present invention (some parts were left out for a better understanding of the drawing)

In FIG. 1, number 100 indicates, as a whole, a slide valve according to the subject-matter of the present invention.

The valve 100 comprises a rectangular metal frame 10, which is divided into two sections 10A, 10B, substantially having the same width, by a transverse metal batten 11 (FIG. 1).

The portion 10A is a box-shaped body comprising a container (not shown), advantageously shaped as the frustum of a pyramid, which is suited to collect the powder particles that can possibly be dragged by the shutter (see below).

In the section 10B, four sides 15A, 15B, 15C, and 15D are provided, which define the periphery of a discharge mouth (OP)—, which can be prismatic or circular and allows the material to flow from the silo (not shown) to a container (not shown, as well), which is arranged under the discharge mouth (OP) and has to be filled with the material coming from the silo.

On the side facing the section 10B, an adjusting device 20 is provided, which acts upon a sealing element 30. In particular, the sealing element 30 is advantageously made of an elastomer material.

To permit a better interpretation of the drawing, a framework was removed from the valve shown in FIG. 1, said framework being fixed, in use, to the four sides 15A, 15B 15C, 15D of the discharge mouth (OP) and simultaneously pressing the sealing element 30 against the side 15D.

In use, as explained more in detail below, the sealing element 30 is pressed by the adjusting device 20 against the upper surface 40A of a shutter 40 (FIGS. 1, 2, 4, 5) having the shape of a flat horizontal plate.

As already mentioned above, the shutter 40 has a surface that is such as to shut (in a plan view) the discharge mouth (OP).

The shutting of the discharge mouth (OP) is achieved by pushing the shutter 40 towards the side 15B of the discharge mouth (OP) and, vice versa, the opening is achieved by pulling the shutter 40 towards the side 15D.

Figure 3:
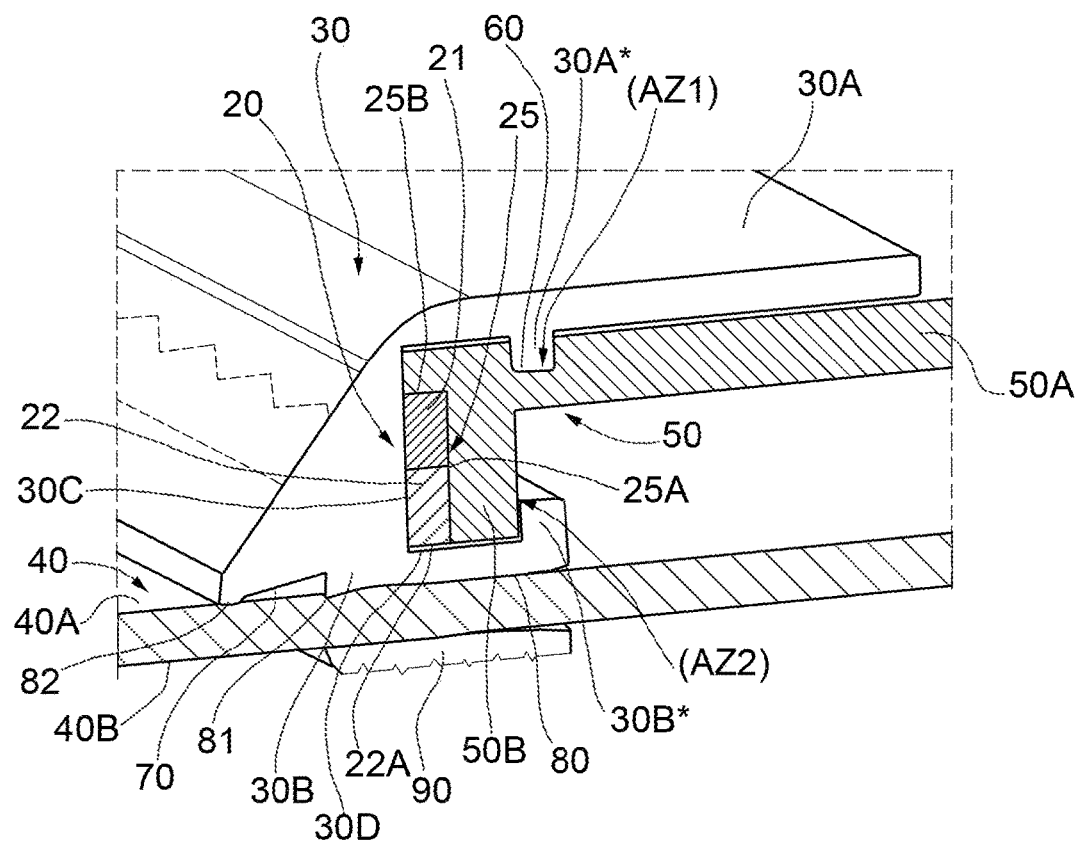
FIG. 3 shows a longitudinal section (according to a plane (Φ)
Figure 4:
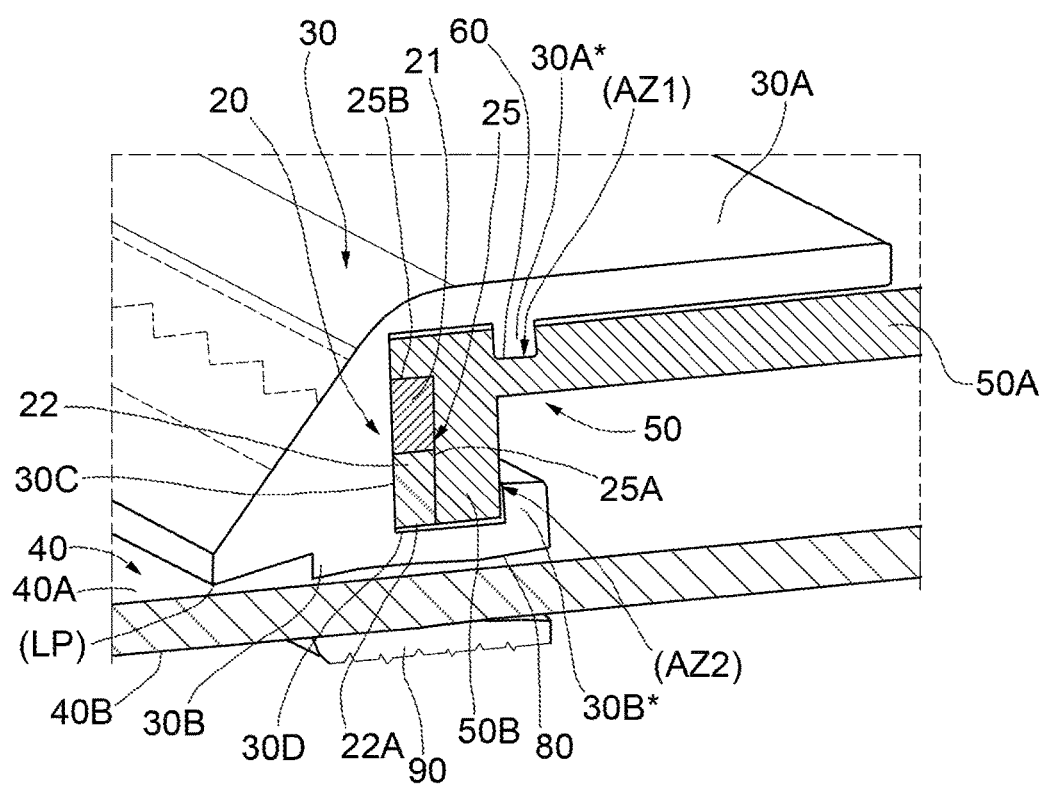
FIG. 4 shows the longitudinal section (again, according to plane (Φ)
Figure 5:
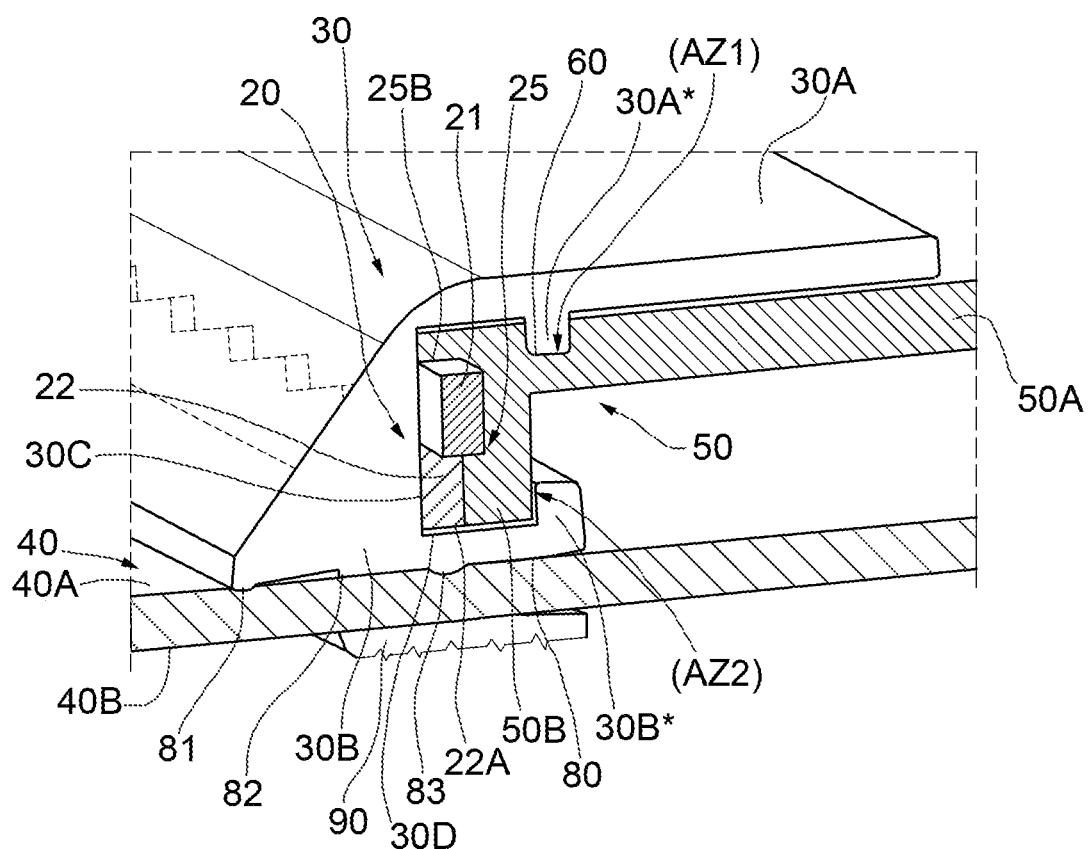
FIG. 5 shows the longitudinal section (again, according to plane (Φ)

During this movement, the shutter 40 is guided by a plurality of idler-wheels (not shown), which are fixed to at least two lateral sides 15A, 15C of the discharge mouth (OP). Therefore, these idler-wheels act against the lower surface 40B of the shutter 40 (FIGS. 3, 4, 5).

In another embodiment, which is not shown, sliders are provided instated of the idler-wheels.

The forward and backward movements of the shutter 40 are performed by means of an actuator 45 (FIG. 1) provided with a stem (not shown). These forward and backward movements take place along an axis (X) and according to two arrows (F1), (F2) with an opposite direction (FIG. 1).

In other embodiments, which are not shown, the shutter is moved by using an electric motor, or a handwheel, or a lever, etc.

The stem of the actuator 45 crosses the section 10A and extends along the aforesaid axis (X).

Even though, thanks to the use of the slide valve 100 provided with the device 20, it is highly unlikely that the particles of material can leak from the discharge mouth (OP) towards the section 10A, we cannot exclude beforehand that some particles of material, especially in the period of time that it takes the user to realize that the height of the sealing element 30 needs to be adjusted, can be dragged by the shutter 40 into the section 10A when the shutter 40 is moved following the arrow (F2).

Therefore, even though the sealing element 30 should be able to completely prevent powder from flowing towards the section 10A, it can occur that, in a clearly undesired manner, some particles are dragged from the shutter 40 into the section 10A.

As already mentioned above, the container arranged inside the section 10A is used to collect these particles of material, which, after having moved beyond the barrier of the sealing element 30, will be conveyed towards the bottom of the container itself, which will be periodically emptied by the user.

In the actual use, the section 10B is joined, on the upper side, to a discharge hopper and, on the lower side, to a conveying device for the material (both not shown). Therefore, the material moves downwards due to gravity, thus flowing through the discharge mouth (OP), when the stem of the actuator 45 is arranged in a retracted position and the slide valve 100 is open.

Hence, as explained more in detail below, the sealing element 30 ensures an extremely effective sealing of the discharge mouth (OP) thanks to its action against the upper surface 40A of the shutter 40, both when the shutter 40 shuts the discharge mouth (OP) and when the shutter 40 moves according to the arrow (F2) to open the discharge mouth (OP).

It should be pointed out that the adjusting device 20 is arranged inside the sealing element 30.

Figure 2:
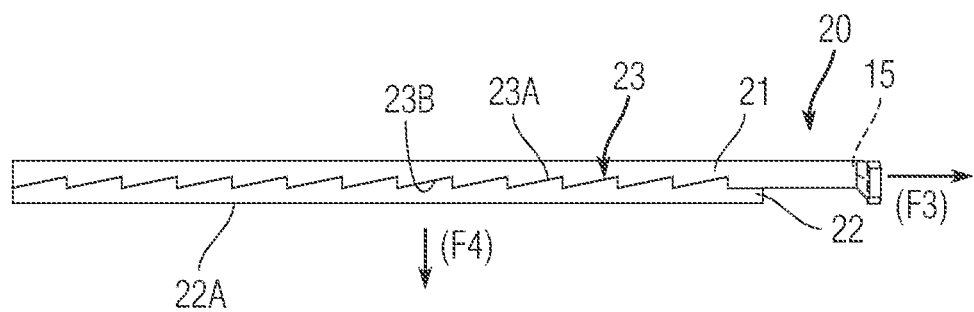
FIG. 2 shows an enlarged view of an adjusting device of a sealing element; this device being used in the slide valve shown in FIG. 1.

With reference, in particular, to FIG. 2, we can see that the adjusting device 20 of the sealing element 30 comprises a first batten 21 lying on a second batten 22 by means of a "saw-toothed" coupling 23. In other words, a first series of inclines 23A, which are obtained on the lower surface of the first batten 21, are coupled in a sliding manner to a second series of inclines 23B, which are provided on the upper surface of the second batten 22.

The same effect can be obtained by using any kind of mechanism (not shown) having inclined planes, wedges, inclined slots in which pins are engaged, or based on the coupling of two curved profiles of any kind.

In other words, the present invention is based on the fact that there is a device in which the horizontal sliding of a first element is turned into a vertical sliding of a second element; said second element acting upon a gasket so as to always ensure a good sealing.

As shown more in detail in FIG. 3, the sealing element 30 comprises an upper portion 30A, which is substantially above the adjusting device 20, and a lower portion 30B, which is substantially arranged next to and under the adjusting device 20.

As shown in the appended FIGS. 3, 4, 5, the upper portion 30A of the sealing element 30 lies on a support element 50, which comprises, in turn, a horizontal plate 50A (which ends against the aforesaid transverse batten 11; FIG. 1) having an end that is provided with a vertical abutment 50B extending downwards.

On the upper surface of the horizontal plate 50A a longitudinal recess 60 is provided, which is able to house a projecting element 30A*, which protrudes from the upper portion 30A of the sealing element 30.

The coupling between the projecting element 30A* and the longitudinal recess 60 represents a first anchoring area AZ1 to anchor the sealing element 30 to the aforesaid support element 50.

A second anchoring area AZ2 to anchor the sealing element 30, again, to the support element 50 consists in the coupling of a bend 30B* of the sealing element 30 to the vertical abutment 50B.

Looking at FIGS. 3, 4, 5, one can see that between the vertical abutment 50B and the lower portion 30B there is defined a cavity 25, which, in use, houses the adjusting device 20. It should be pointed out that the cavity 25 advantageously but not necessarily has the shape of a rectangular cuboid.

More in detail, as shown in FIG. 3, the cavity 25 is defined by the following walls:
- a first vertical face 25A obtained on the vertical abutment 50B;
- a second vertical face 30C obtained on the lower portion 30B of the sealing element 30;
- a first horizontal face 25B obtained on the vertical abutment 50B; and
- a second horizontal face 30D obtained on the lower portion 30B of the sealing element 30.

It should also be pointed out that the lower surface of the vertical abutment 50B rests on the second horizontal face 30D, as well.

On the lower face 80 of the lower portion 30B, which, in use, lies on the upper surface 40A of the shutter 40, there are two contact points 81, 82.

Incidentally, it should be pointed out that, even though, in this context, we are talking about "contact points", we are obviously not dealing with actual "points" in a geometrical sense, but with substantially rectangular areas that extend transversely to the axis (X). The width of each transverse area depends, of course, on the type of material of which the sealing element 30 is made, which can be more or less deformable, and on the strength with which this sealing element 30 is pressed against the upper surface 40A of the shutter 40.

As shown in the FIGS. 3, 4, 5, a further lower sealing element 90, which can be advantageously but not necessarily shaped like the upper sealing element 30 described above or can be similar thereto, can act upon the lower surface 40B of the shutter 40.

If, due the periodic friction between the lower face 80 of the lower portion 30B against the upper face 40A of the shutter 40, in correspondence to the two points 81, 82, the contact points 81, 82 are subject to wear, the situation occurring in this case is basically the one shown in FIG. 4.

To restore the lost sealing power between the sealing element 30 and the upper surface 40A of the shutter 40, the user simply has to move the first batten 21 according to an arrow (F3) (FIG. 2), so that the relative sliding of the first series of inclines 23A relative to the second series of inclines 23B generates a downward movement, according to an arrow (F4), of the second batten 22, whose lower surface 22A (FIGS. 2, 3) presses against the second horizontal face 30D of the sealing element 30.

In other words, thanks to the deformability of the material of which the sealing element 30 is made, the action of the lower surface 22A of the second batten 22 upon the horizontal face 30D turns into a consequent action of the lower face 80 of the sealing element 30 upon the upper surface 40A of the shutter 40, thus restoring the sealing power.

Now, the case is the one shown in FIG. 5, where, namely, a third contact point 83 is created next to the aforesaid contact points 81, 82 due to the local deformation of the lower face 80 in correspondence to the adjusting device 20.

It should be pointed out that the three contact points 81, 82, 83 are substantially aligned and lie all on the lower face 80.

The present slide valve 100 works correctly even with a single one of the sealing points 81, 82, 82 in contact with the upper surface 40A of the shutter 40.

Therefore, the restoring of the correct sealing power can create an interference between the sealing element 30 and the upper surface 40A that was not there before (contact point 83) and/or can restore an interference point (at least one of the contact points 81, 82) that was previously subject to wear.

Advantageously but not necessarily, the movement of the first batten 21 relative to the fixed frame 10 can be operated by the user be screwing a screw (not shown), whose free end is curved (see FIGS. 1, 2) and is provided with an eyelet 15, which houses the screw. Therefore, if the user screws this screw, the free end of the latter, by pressing against the fixed frame 10, causes the linear movement of the first batten 21 according to the arrow (F3).

Hence, the downward movement of the second batten 22 (arrow (F4)) turns into a greater pressure exerted by the lower face 80 upon the upper face 40A of the shutter 40, with a consequent increase in sealing power.

Furthermore, it should be pointed out that, due to the way in which the adjusting device 20 was conceived, the straight sealing element is always subject to the same pressure, no matter what, along its entire longitudinal extension and this allows every contact point 81, 82 (83, if provided) to be subject to wear in the same way and to the same extent.

It should also be pointed out that the arrow (F3) (with an axis (Y) that is perpendicular to the aforesaid axis (X)) is transversal to the arrows (F1), (F2) and to the axis (X). Furthermore, the arrow (F4) is perpendicular both to the arrows (F1), (F2), on the one hand, and to the arrow (F3), on the other hand.

It should also be pointed out that the horizontal movement of the first batten 21 is guided by the faces 25A, 25B, 30C of the cavity 25.

In a further embodiment, which is not shown, the lower batten moves transversely and vertically, whereas the upper batten remains still. In order to make the description easier, the valve according to the present invention was described and Claimed with reference to the most common arrangement, namely the one in which the shutter lies horizontally and the material to be intercepted is arranged above the valve. Obviously, the valve can have a different arrangement, for example it can be rotated relative to the figures shown in the drawings.

Obviously, the slide valve according to the present invention can be subject to variations and changes of a practical-applicative nature, without for this reason going beyond the scope of protection of the invention as Claimed below.

The main advantage of the slide valve according to the present invention lies in possibility to adjust, in a simple and intuitive manner, the lower lip of the sealing element, which is always kept pressed, in a uniform manner, against the upper surface of the shutter, so as to avoid dangerous leaks of powdered material towards the actuator organs of the valve.

The invention claimed is:

1. A slide valve (100) for a powdered material or a material with a small grain size; said valve comprising a frame (10), having an opening in the form of a discharge mouth (OP) to discharge the material, and a shutter (40), which is activated by an actuator (45), said shutter (40) being movable relative to the frame (10) and configured to shut, in plan view, said discharge mouth (OP);

said valve being characterized in that it comprises, furthermore, a height adjusting device (20) for a sealing element (30), said height adjusting device (20) being configured to compensate the loss of sealing effect between a lower face (80) of said sealing element (30) and an upper face (40A) of said shutter (40), said loss of sealing effect being due to the wear generated by the relative friction between said lower face (80) of said sealing element (30) and said upper face (40A) of said shutter (40);

wherein said sealing element (30) comprises an upper portion (30A), which is disposed above the adjusting device (20), and a lower portion (30B), which is arranged next to and below the adjusting device (20);

wherein said upper portion (30A) of said sealing element (30) lies on a support element (50), which comprises, in turn, a horizontal plate (50A) having an end that is provided with a vertical abutment (50B) extending downwards; on the upper surface of said horizontal plate (50A) there being provided a longitudinal recess (60), which is sited to house a projecting element (30A*), which protrudes from said upper portion (30A) of said sealing element (30); the coupling between said projecting element (30A*) and said longitudinal recess (60) representing a first anchoring area (AZ1) to anchor said sealing element (30) to said support element (50).

2. A slide valve (100), according to claim 1, characterised in that said adjusting device (20) comprises a first element (21; 22), which is coupled to a second element (22; 21); a substantially horizontal movement of said first element (21; 22) turning into a substantially vertical movement of said second element (22; 21), which, in turn, acts on said sealing element (30) so as to restore the sealing effect desired.

3. A slide valve (100), according to claim 1, characterised in that on the lower face (80) of said sealing element (30) there is at least one contact point between said lower face (80) and said upper surface (40A) of said shutter (40), said at least one contact point including a first contact point (83) being due to the local deformation of said lower face (80) due to said adjusting device (20).

4. A slide valve (100), according to claim 1, characterised in that between said lower face (80) and said upper surface (40A) of said shutter (40) there are second and third contact points (81, 82).

5. A slide valve (100), according to claim 1, characterised in that said adjusting device (20) comprises a first batten (21) lying on a second batten (22) by means of a "saw-toothed" coupling (23).

6. A slide valve (100), according to claim 1, characterised in that a second anchoring area (AZ2) to anchor said sealing element (30) to said support element (50) consists in the coupling of a bend (30B*) of said sealing element (30) to said vertical abutment (50B).

7. A slide valve (100), according to claim 1, characterised in that between said vertical abutment (50B) and said lower portion (30B) of said sealing element (30) there is defined a cavity (25), which houses said adjusting device (20).

8. A slide valve (100), according to claim 1, characterised in that a further lower sealing element (90) acts upon the lower surface (40B) of said shutter (40).

* * * * *